Aug. 11, 1959                EIJIRO TOYODA                 2,898,681
                    MACHINE FOR CUTTING CYCLOID GEARS
Filed Nov. 27, 1951                                    4 Sheets-Sheet 1

Fig~1.

INVENTOR.
Eijiro Toyoda
BY
ATTORNEY.

INVENTOR.
Eijiro Toyoda
BY
ATTORNEY.

Aug. 11, 1959  EIJIRO TOYODA  2,898,681
MACHINE FOR CUTTING CYCLOID GEARS
Filed Nov. 27, 1951  4 Sheets-Sheet 4

INVENTOR.
Eijiro Toyoda
BY
ATTORNEY.

United States Patent Office 2,898,681
Patented Aug. 11, 1959

2,898,681

MACHINE FOR CUTTING CYCLOID GEARS

Eijiro Toyoda, Shinjuku-ku, Tokyo-to, Japan; Hideko Toyoda, Hiroshige Toyoda, Michiko Niikura (Toyoda), Yoshiko Kawabe (Toyoda), Yoko Toyoda, Harumi Toyoda, Eiko Toyoda and Mieko Toyoda, minor, by mother Hideko Toyoda, heirs of Eijiro Toyoda, deceased, assignors to Kabushiki Kaisha Hakko Denki Seisakusho, Nagano-ken, Japan Application November 27, 1951, Serial No. 258,464

Claims priority, application Japan December 5, 1950

3 Claims. (Cl. 33—27)

Most of the gears which are generally used belong to the class of involute gears. When an involute curve is used as the tooth-model, the slip-ratio of the teeth of the gear is not uniform along the surface from the face to the flank of the teeth and much friction occurs, resulting in rapid wear of the tooth surface and in vibrations and noise. If we, however, use cycloid curves, the slip-ratio can be kept uniform without the above-mentioned defects. In spite of these merits, cycloid gears are not yet used in practice owing to the difficulty of effectively cutting or grinding a cycloid gear.

The object of this invention is to provide a machine which can very simply and effectively cut a cutter model on a circular bit. By means of the circular bit the hob cutter for cycloid gears is cut in the usual way.

According to the invention, in the cutting of a cycloid gear, the rack cutter, the pinion cutter, the hob, and the related elements are used as in the case of the cutting of involute gears, but two curves drawn drawn by the rolling circles corresponding to the face and the flank of the tooth are joined on the pitch line so that a smoothly continuous curve may be formed on the upper and lower side of the pitch line. Such curve is used as the fundamental tooth-model in this invention. This curve is herein designated the joined cycloid curve which resembles a cycloid although it is not a true cycloid.

Figure 8:
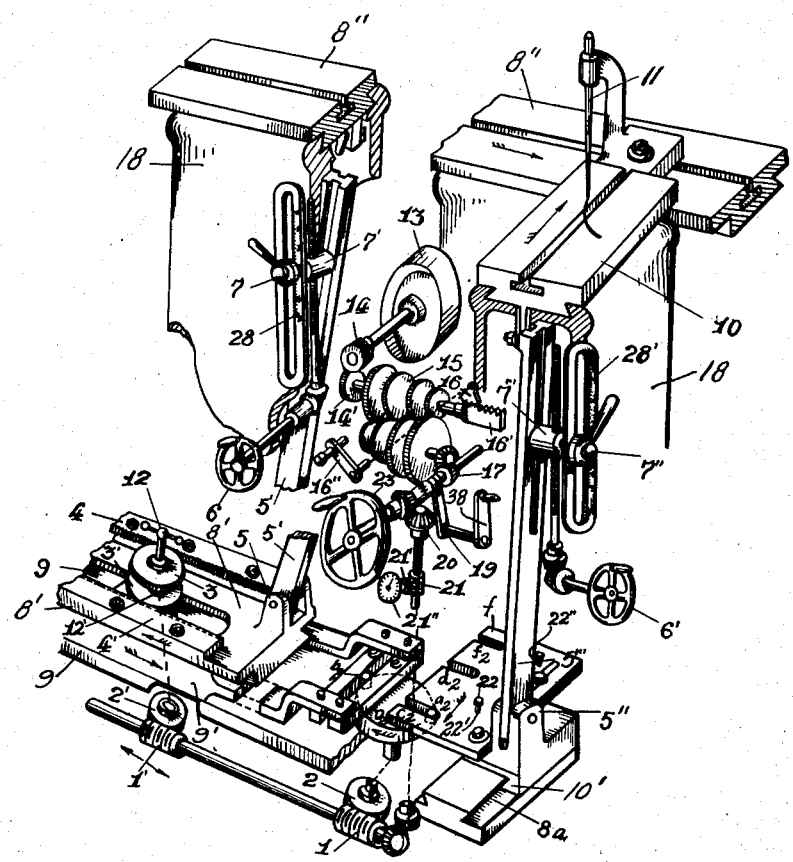
Fig. 8 is a perspective view of a commercial machine embodying features of the present invention, with portions cut away to show details of the internal structure.

The machine shown in Fig. 8 comprises a slideway 9 mounted on the machine base (not shown) with a slide 9' slidable therealong. Slide 9' includes a slideway parallel to its direction of motion along which slide 8' is slidable. Slide 8' includes racks 4, 4' secured in parallel to its direction of motion. Racks 4, 4' are arranged to engage with wheels 3, 3' respectively. Describing wheels 3, 3' are supported by a bearing on the slide 9' on a common shaft. The shaft is provided with worm gears 1', 2' at its lower end and a handle 12 at its top. Handle 12 actuates the clutch 12' for effecting the engagement of the shaft with describing wheel and rack 3, 4 or describing wheel and rack 3', 4'. Ear 5, which is integral with slide 8; is the pivot of the lever 5'. Lever 5' is vertically held by pivot 7' whose position can be adjusted by the hand-wheel 6 in accordance with the diameter of the describing circle. After adjustment, pivot 7' is fixed by the set screw 7. The position of the set screw 7 can be read on the scale 28. The abscissa slide 8" is pivoted at the top of the lever 5'. Slide 8" is slidable along a guideway on the machine frame 18. In this modified construction the joining mechanism consists of a standard plate $e$, joining disc $D_2$, a standard plate $f$ with projections or arms $c_2$, $d_2$ $f_2$. Standard plate $e$ is secured on an extension of slide 9' and is engaged by the roller $a_2$ or $b_2$ of the joining disc $D_2$. Joining disc $D_2$ is rotatably mounted on the machine base (not shown). The shaft of disc $D_2$ is provided with worm gears 1, 2. Standard plate $f$ is fixed on the slide 10' which is slidable on the guideway 8a. Ear 5", which is integral with slide 10', is the pivot of the lever 5'''. Lever 5''' is vertically held by pivot 7''' whose position can be adjusted by the hand wheel 6' in accordance with the diameter of the describing circle. Lever 5''' should have the same length as lever 5', and should be arranged at the same level as lever 5'. The position of the pivot 7''' should be adjusted on the lever 5''' to provide the same lever ratio which is required for the pivot 7' on the lever 5'. At the top of the lever 5''' the ordinate slide 10 is pivoted. Slide 10 is slidable along a guideway on the machine frame 18.

The driving pulley 13 is mechanically connected to worm 14, worm wheel 14', speed change gear 15, bevel gear 17, 20, worm 1, worm wheel 2, worm 1' and worm wheel 2'. Speed change gear 15 is provided with a rack 16' which is engaged with segment 16. Segment 16 is controlled by the handle 16". Bevel gears 17 and 20 are connected through the clutch 19.

If we take the distance between the roller $a_2$ and $b_2$ of disc $D_2$ and the pitch-diameters of the describing wheels or pinions 3, 3' in a predetermined relation, then the resultant movements of the slide 10 and 8" will construct the joined cycloid curves with various diameters of rolling circles in accordance with the adjustment of the pivot points 7', 7''' of the levers 5', 5'''. The worm gears 1, 2 drive the joining disc $D_2$ and the worm gears 1', 2' drive the describing wheel 3 or 3' against rack 4 or 4', which convert the rotational movement of the wheel into a linear motion for both the left and the right side of the workpiece. The lever ratio should be adjusted to correspond to the diameter of the describing circles (also the joining circle) on the workpiece. The positions of the pivot points 7', 7''' are read on the scales 28, 28' to facilitate such adjustment. The operation of the apparatus in Fig. 8 is effected by driving the joining disc $D_2$ and the describing wheel 3 or 3' by means of the driving pulley 13 through the speed reduction worm gears 14, 14', the speed change gears 15, the segment 16, rack 16', and handle 16", the bevel gears 17, 20, the clutch 19, and the worm gears 1, 2 and 1', 2', etc., this mechanism also driving through worm 21, 21' the indicator 21" of rotation of the joining disc $D_2$. When manual adjustment for a slight correction is necessary, then the clutch 19 is disengaged and the bevel gear 20, worm 21 are driven by the hand wheel 23. The pin 22 is set at the position 22', as shown in Fig. 8, during the operation of the arms $c_2$, $d_2$ and is moved after sliding the standard plates $f$ over the slide 10', to the position 22'' which is spaced from the position 22' by the distance between the centers of the rollers $a_2$, $b_2$ during the operation of the arms $d_2$, $f_2$ of the standard plate $f$. Among these mechanisms, the driving members numbered 13 to 21 and 38 can be replaced by any other well-known mechanisms. Indicated at 11 is the cutting tool which is suitably a bit.

Figure 2:
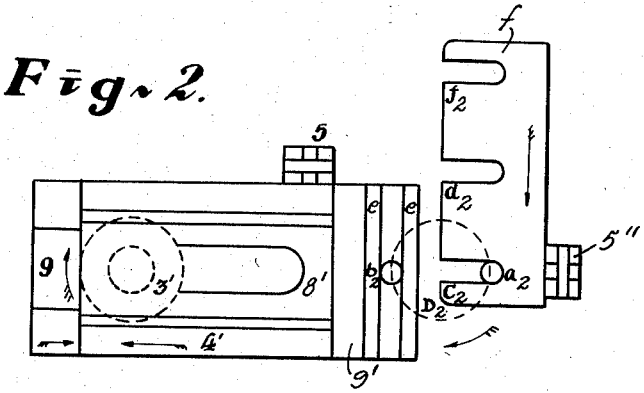
Fig. 2 is a plan view of a construction in accordance with the invention showing the relative relationships of the describing disc, the joining discs and the standard plates the parts being shown in starting position.
Figure 3:
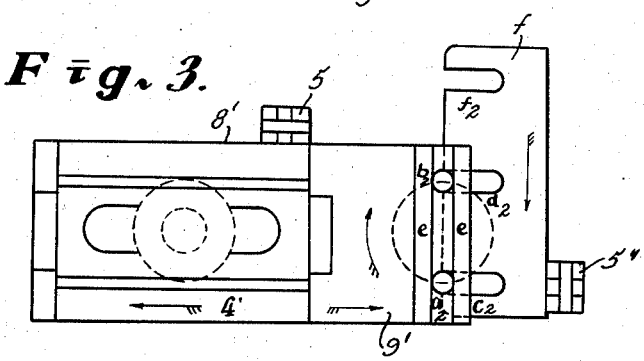
Fig. 3 is a similar view showing the parts illustrated in an intermediate position in which the joining disc is turned by 90° with respect to the position shown in Fig. 2.
Figure 4:
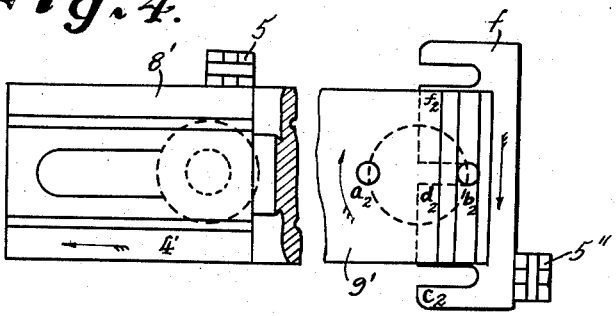
Fig. 4 is a similar view showing the parts in an end position in which the joining disc is turned by 180° with respect to Fig. 2, the joined cycloidal curve on one side of a tooth model being completed by reason of the progress shown in Figs. 2, 3 and 4.
Figure 5:
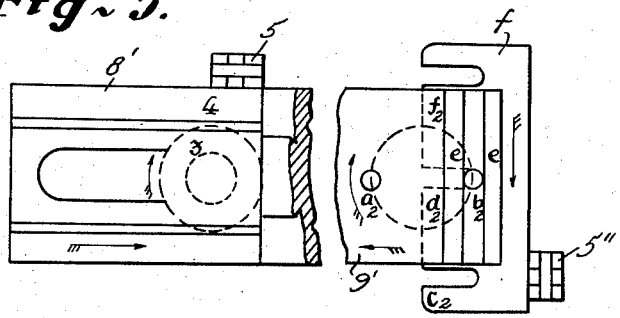
Fig. 5 is a similar view showing the starting position of the joined cycloidal curve on the other side of a tooth model.
Figure 6:
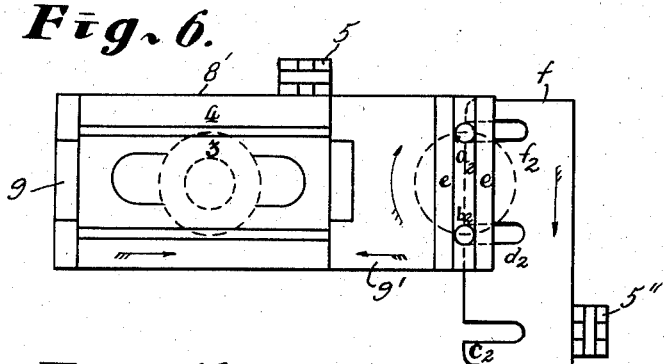
Fig. 6 is a similar view showing the parts in an intermediate position in which the joining disc is turned by 90° with respect to Fig. 5.
Figure 7:
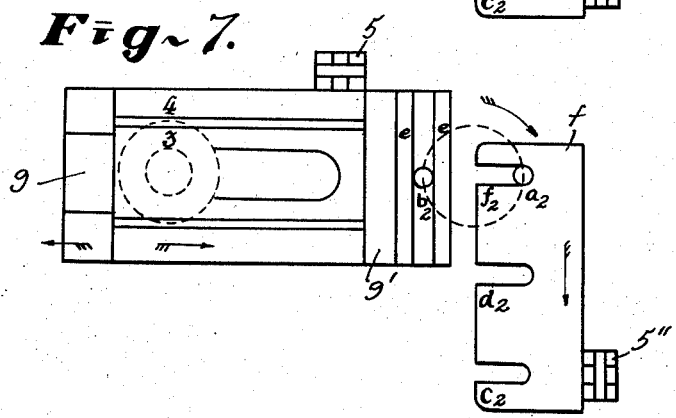
Fig. 7 is a further view showing the parts in an end position in which the joining disc is turned by 180° with respect to Fig. 5, the joined cycloidal curves being completed as a result of the movements shown in Figs. 5, 6 and 7.

Figs. 2 to 7 show the relative movements of the describing discs, the joining disc, and the standard plates described above in connection with Fig. 8, only describing wheel 3' being shown for convenience. Referring to Fig. 2, when the joining disc $D_2$ and the describing wheel 3' rotate clockwise, then the arm $c_2$ of the standard plate $f$ is shifted downwardly by the roller $a_2$, the standard plate $e$ is shifted to the right by the roller $b_2$, and the rack 4' which is secured to the abscissa slide 8' and geared with describing wheel 3' is shifted along the guideway provided on slide 9' towards the left. When the shifted parts reach the position shown in Fig. 3, the roller $a_2$ leaves the arm $c_2$, the roller $b_2$ pushes the arm $d_2$ downwardly, the standard plate $e$ and the rack 4' continue their displacement in the same direction, and the movement is completed in the position shown in Fig. 4. Accordingly, if we take the distance between the rollers $a_2$ and $b_2$ equal to the pitch-diameter of the describing wheel 3', then the relation between the abscissa and ordinate movements becomes the joined cycloid movement. The aforesaid movement from Fig. 2 to Fig. 4 corresponds to the right-side of the cutter-teeth and the movement for the left-side is shown in Fig. 5 to Fig. 7. The above-mentioned pin 22 is moved from position 22' to position 22'' and vice versa to locate slide 10' at either of two alternative positions along standard plate $f$, the adjustment between these two positions being made in changing from drawing one side of the cutter teeth, e.g. the right side, to drawing the other side of the cutter teeth, e.g. the left side.

In Fig. 8, the describing wheel 3' and the joining disc $D_2$ are situated at the starting position which corresponds to Fig. 2. When the common shaft or worm 1, 1' is driven, worm 1 and worm wheel 2 drive the joining disc $D_2$ as shown in Fig. 2 to Fig. 4. Meanwhile worm 1' and worm wheel 2' drive the describing wheel in the manner shown in these figures. The movements of the describing disc and of the joining discs can be magnified or reduced to any desired ratio by reason of the construction shown.

Figure 1:
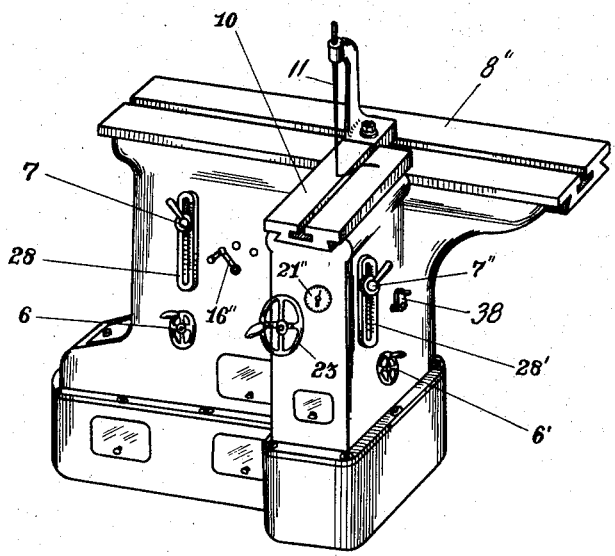
Fig. 1 is a perspective view showing the outside casing enclosing the mechanism shown in Fig. 8.

In Fig. 1, which shows the exterior of the casing containing the mechanism shown in Fig. 8, there will be seen the handwheels 6, 6' for adjusting the pivots of the levers, the hand wheel 23, the indicating scales 28, 28' for the positions of the pivots, the set screws 7, 7'' of the pivots, the lever 38, the change over clutch 16'', the indicator 21'', the slides 8'' and 10 and the cutting tool, e.g. bit 11.

It will be understood that the invention is not restricted to the above-described embodiments and is susceptible of modification within the scope of the appended claims.

What is claimed is:

1. In a machine for cutting with a cutting tool the cutter model having a joined cycloidal profile for a circular bit, a first mechanism comprising a rotatable joining disc, a standard plate actuated upon rotation of said joining disc to undergo linear motion equal to a first component of the rotational motion of the joining disc, a second mechanism simultaneously actuated by the movements of said joining disc to undergo linear motion equal to a second component of the rotational motion of the joining disc, an abscissa slide and an ordinate slide for receiving the movements of said second mechanism and said standard plate, respectively, and levers for transmitting the motion of said second mechanism and said standard plate to said respective slides, the cutting tool being positioned to be moved by the movements of one of said slides and the other of said slides being adapted to receive the workpiece.

2. A machine as defined in claim 1, further comprising means for shifting the fulcrum point of said levers to selected predetermined positions.

3. A machine tool for cutting the cutter model having a joined cycloidal profile for a circular bit which comprises, a mechanism comprising a rotatable disc, a first standard plate movable in the ordinate direction by said disc and a second mechanism movable in the abscissa direction by said disc simultaneously, an abscissa slide for receiving the movements of said second mechanism and rotatable driving means mounted on said second mechanism and engaging said abscissa slide for moving said abscissa slide in the abscissa direction, a first driven slide and a second driven slide, and levers interconnecting said driven slides with said first standard plate and with said abscissa slide, respectively, whereby one of said levers is actuated by the movements of said first standard plate and the other of said levers is actuated by the movements of said second mechanism and said abscissa slide, and means for rotating said disc and said means for moving the abscissa slide simultaneously, relative movement between the tool and the workpiece being produced by the movements of said driven slides.

References Cited in the file of this patent

UNITED STATES PATENTS

| | | |
|---|---|---|
| 1,817,405 | Braren | Aug. 4, 1931 |
| 2,025,842 | Africano | Dec. 31, 1935 |
| 2,267,250 | Mossdorf | Dec. 23, 1941 |
| 2,553,026 | Williams et al. | May 15, 1951 |

FOREIGN PATENTS

| | | |
|---|---|---|
| 38,024 | Germany | Jan. 3, 1887 |